US009186875B1

(12) United States Patent
Loen et al.

(10) Patent No.: US 9,186,875 B1
(45) Date of Patent: *Nov. 17, 2015

(54) PROCESSING IMPROVEMENTS IN APPLYING POLYESTER ONTO A METAL SUBSTRATE

(71) Applicants: Mark V. Loen, Maricopa, AZ (US); James E. Velliky, Jacksonville, FL (US)

(72) Inventors: Mark V. Loen, Maricopa, AZ (US); James E. Velliky, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,508

(22) Filed: Jun. 6, 2014

Related U.S. Application Data

(60) Continuation-in-part of application No. 13/759,538, filed on Feb. 5, 2013, now Pat. No. 8,784,601, which is a division of application No. 13/108,584, filed on May 16, 2011, now Pat. No. 8,404,064, which is a continuation-in-part of application No. 12/388,011, filed on Feb. 18, 2009, now Pat. No. 7,942,991, which is a continuation-in-part of application No. 11/530,723, filed on Sep. 11, 2006, now Pat. No. 7,678,213.

(60) Provisional application No. 60/716,053, filed on Sep. 13, 2005.

(51) Int. Cl.
| B32B 37/00 | (2006.01) |
| B32B 37/14 | (2006.01) |
| B32B 37/06 | (2006.01) |
| B32B 38/00 | (2006.01) |
| B32B 37/02 | (2006.01) |

(52) U.S. Cl.
CPC ............... *B32B 37/14* (2013.01); *B32B 37/02* (2013.01); *B32B 37/06* (2013.01); *B32B 38/0004* (2013.01)

(58) Field of Classification Search
CPC ........ B29C 65/10; B29C 65/106; B32B 7/12; B32B 15/08; B32B 15/18; B32B 27/08; B32B 27/36; B32B 37/02; B32B 37/06; B32B 37/206
USPC ............. 156/64, 82, 250, 259, 267, 281, 282, 156/308.2, 309.9, 322, 324, 555, 582, 583.1
See application file for complete search history.

(56) References Cited

U.S. PATENT DOCUMENTS

| 4,389,438 A | 6/1983 | Ohtsuki et al. |
| 4,460,646 A | 7/1984 | Inoue |
| 4,552,605 A | 11/1985 | Itoh et al. |
| 4,622,237 A | 11/1986 | Lori |
| 4,957,820 A | 9/1990 | Heyes |
| 4,980,210 A | 12/1990 | Heyes |
| 5,059,460 A | 10/1991 | Heyes et al. |
| 5,093,208 A | 3/1992 | Heyes et al. |
| 5,100,708 A | 3/1992 | Heyes et al. |
| 5,125,301 A | 6/1992 | Miller et al. |
| 5,149,389 A | 9/1992 | Heyes et al. |
| 5,238,517 A | 8/1993 | Heyes |
| 5,318,648 A | 6/1994 | Heyes et al. |
| 5,618,621 A | 4/1997 | Hasegawa et al. |
| 5,679,200 A | 10/1997 | Newcomb et al. |
| 5,686,510 A | 11/1997 | Asai et al. |

(Continued)

*Primary Examiner* — James Sells

(57) ABSTRACT

The invention is a laminating process which is directed toward economical production methods for scalable amounts of production which develop properties suitable for a broad based product line. In particular, the product is capable of important key components of commercial properties such as adhesion, scratch resistance, chemical inertness, and bending without failure.

14 Claims, 8 Drawing Sheets

(56) References Cited

U.S. PATENT DOCUMENTS

Figure 1:
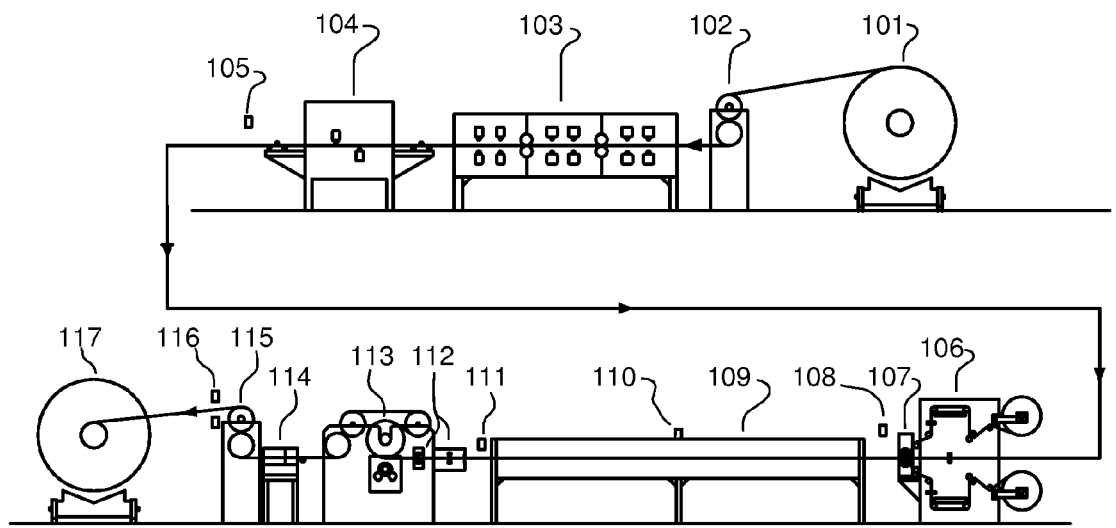

| | | | |
|---|---|---|---|
| 5,900,325 A | 5/1999 | Okamura et al. |
| 5,919,517 A | 7/1999 | Levendusky et al. |
| 5,985,080 A | 11/1999 | Kobayashi et al. |
| 5,992,493 A | 11/1999 | Yasunaka et al. |
| 6,017,599 A | 1/2000 | Sakamoto et al. |
| 6,045,905 A | 4/2000 | Tate |
| 6,071,599 A | 6/2000 | Kosuge |
| 6,080,260 A | 6/2000 | Yasunaka et al. |
| 6,106,658 A | 8/2000 | Kaguma et al. |
| 6,164,358 A | 12/2000 | Kaguma et al. |
| 6,200,409 B1 | 3/2001 | Tanaka et al. |
| 6,217,991 B1 | 4/2001 | Tanaka et al. |
| 6,309,720 B1 | 10/2001 | Shimizu et al. |
| 6,420,010 B1 | 7/2002 | Hasegawa et al. |
| 6,458,235 B1 | 10/2002 | Beentjes et al. |
| 6,551,434 B1 | 4/2003 | Yamada et al. |
| 6,551,662 B1 | 4/2003 | Schmid et al. |
| 6,758,903 B2 | 7/2004 | Levendusky et al. |
| 6,758,933 B2 | 7/2004 | Beentjes |
| 6,827,980 B2 | 12/2004 | Schmid et al. |
| 6,841,252 B2 | 1/2005 | Kroes et al. |
| 7,101,590 B2 | 9/2006 | Schmid et al. |
| 7,942,991 B1 * | 5/2011 | Loen et al. | 156/64 |
| 8,343,291 B1 * | 1/2013 | Loen et al. | 156/64 |
| 8,404,064 B1 * | 3/2013 | Loen et al. | 156/64 |
| 8,784,601 B1 * | 7/2014 | Loen et al. | 156/281 |
| 2005/0112391 A1 | 5/2005 | Schmid et al. |
| 2006/0243626 A1 | 11/2006 | Spaans et al. |

* cited by examiner

PROCESSING IMPROVEMENTS IN APPLYING POLYESTER ONTO A METAL SUBSTRATE

CROSS REFERENCE TO RELATED APPLICATIONS

This application is a continuation in part of U.S. Pat. No. 8,784,601 filed on Feb. 5, 2013, which is a divisional of U.S. Pat. No. 8,404,064, filed on May 16, 2011, which is a continuation in part of U.S. Pat. No. 7,942,991 filed on Feb. 18, 2009, which is a continuation in part of U.S. Pat. No. 7,678,213 filed on Sep. 11, 2006, which claims the benefit of U.S. Provisional Application No. 60/716,053 filed on Sep. 13, 2005. All referenced applications and patents are incorporated herein by reference.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1). Field of the Invention

This application is directed to laminating films in the solid state onto metal substrates. In particular, applying bi-axially oriented polyester films onto metal substrates to create a commercial bond on an industrial processing line whereby multiple desirable commercial properties are simultaneously developed.

(2). Description of Related Art

Others have described laboratory processing steps related to putting films onto metal surfaces. For example, U.S. Pat. No. 5,330,605 describes preheating a metal strip and then laminating a biaxially oriented copolyester resin film. However, a post treating step has been found to be necessary for permanent commercial adhesion in many important markets, and the post treating step is troublesome when used with an oriented polyester film because it can alter crystalline properties. It is difficult to obtain sufficient bonding for demanding stamping applications with additionally demanding chemical resistance requirements. Since crystallinity provides important commercial pencil hardness, toughness, and chemical resistance properties, a high temperature post heating step will change the crystallinity in actual use.

U.S. Pat. No. 5,149,389 and U.S. Pat. No. 5,093,208 describes a thermal laminating process where a metal strip is preheated, laminated, post heated, and quenched in water. The process targets the creation of non-crystalline polyester coating that is generally useful for can making. Unfortunately, the lack of crystallinity is a distinct disadvantage in creating desirable commercial characteristics such as pencil hardness, chemical resistance, and toughness in bending (i.e. coating continuity).

U.S. Pat. No. 5,318,648 describes a thermal laminating process where the cooling process is specifically performed to avoid creating crystallinity in the laminate film. This has similar problems with pencil hardness and toughness properties just described.

U.S. Pat. No. 3,679,513 describes a thermal laminating process for a polyethylene. The process does not describe pretreating the metal surface by raising the surface energy nor does it describe methods of creating crystallinity in the finished laminate film to develop pencil hardness or bending toughness. Polyethylene is not known to develop desirable commercial properties and the low melting point of polyethylene is undesirable for many markets when compared to other polymers.

U.S. Pat. No. 5,679,200 describes a thermal laminating process for applying a film to a metal strip where the laminating rolls provide a specific force. The patent is directed toward a specific laminating nip force related to avoiding the pickup of film onto the nip rolls. The process does not describe pretreating the metal surface by raising the surface energy nor does it describe methods of creating crystallinity in the finished laminate film.

U.S. Pat. No. 5,695,579 describes a thermal laminating process where the polymer coated metal is rapidly and immediately quenched after post treating to ensure that the coating is amorphous. The described process is designed to avoid creating crystallinity in the finished laminate film. The process does not describe pretreating the metal surface by raising the surface energy nor does it describe methods of creating crystallinity in the finished laminate film.

Others have worked on important commercial-technical issues such as the eliminating entrapped air between the film and metal substrate. For example, U.S. Pat. No. 6,200,409 describes an improved laminating process which works on eliminating air bubbles by heating the laminating nip rolls and preheating the film prior to laminating. Similarly, U.S. Pat. No. 6,164,358 describes efforts at reducing air entrapment by using a support roll with a projected film angle. In the later disclosure, a commercially acceptable amount is defined as an 8% area covered by entrapped air. Others, such as U.S. Pat. No. 5,679,200, have attempted to handle trapped air through increased nip forces.

Important commercial markets are open to lamination provided that acceptable adhesion, pencil hardness, bending toughness, and corrosion protection can be simultaneously achieved. These markets are currently served by the pre-painted coil coated industry.

Typical products include the following:
1) Building and Construction Products such as: Roofing & Siding, Exterior Accessories, Structural & Mechanical, Interior Components, Manufactured Housing, Garage Doors, and Doors & Windows.
2) Transportation Products such as: Passenger Cars, Vans, & Light Trucks, Trucks & Semi-Trailers, Buses, and Travel Trailers & Recreational Vehicles.
3) Business and Consumer Products such as: Large & Small Appliances, Electronics, Water Heaters & Water Softeners, Heating & Cooling Equipment, Home & Office Furniture, Window Equipment, Toys & Sporting Goods, Fixtures & Shelving, and Lighting.
4) Containers and Packaging Products such as: Cans, Ends, Tabs, Crowns, & Closures, Barrels, Drums, & Pails, Strapping & Seals, and Draw & Ironed can bodies,
5) Other/Miscellaneous Products such as: Machinery & Industrial Equipment, Electrical Equipment, and Signs & Displays.

It is important to note that the referenced patents have not resulted in a commercially viable high production thermal laminating line in the United States. The difficulties in simultaneously scaling up production, creating an economically viable process, and developing suitable commercial properties have been strong barriers to the actual implementation of a laminating process. The previous efforts by others have been lacking in important technical aspects of cooperation between the processing steps, economic viability, and suitable commercial properties.

Current high production laminating methods in the United States address metal substrates, i.e. 0.005" and above, are primarily directed at utilizing press on adhesives which are applied by a roller onto the metal substrate, and the adhesive is dried in an oven prior to the laminating step. This process is commonly added to, or is a part of, a commercial coil paint line. The application of the film to the metal substrate is generally done close to ambient temperatures. The adhesive is separately applied to the metal substrate and is usually not a part of the film, such as a multilayer film.

It is important that high production thermal laminating methods have little or no entrapped air between the metal substrate and the film. Entrapped air causes thinning of the coating at an unpredictable amount. In particular, when a formed part is bent and the bend occurs where an air bubble exists in the coating, an increased likelihood of failure results. Air entrapment is a serious issue when the air bubble size is significant relative to the coating thickness, and the frequency is high. It is also visually disturbing at an 8 percent level to a customer, on a surface area basis, and raises unnecessary questions about process control.

It is important that the coating has the necessary pencil hardness, that is, surface scratch resistance, and also suitable bending capability. This will allow normal material handling without scratches. Coating hardness must be balanced against brittleness. A hard coating has an increased likelihood of splitting on the bend of a formed part. If the coating splits, the metal is exposed and there is likelihood of a corrosive failure at that spot.

From a commercial standpoint, it is important that the coating also has suitable chemical resistance after forming a finished part, which comes from a stamping or bending operation. In the can-making industry, pack tests are performed that are very demanding on forming and chemical resistance. Formed parts, such as a can, are packed with typical or harsh commercial materials and stored at an elevated temperature to accelerate any corrosive action. Test storage temperatures are 100 to 120° F. for periods of one to twenty four months. More commonly, a one, three, or six month test is sufficient to determine if a coating will fail in a pack test, depending upon the product. The main success/failure criterion is whether there is defect free through a can making (i.e. stamping) operation, visual corrosion, and whether the coating delaminates.

In summary, it has been difficult to develop the necessary simultaneous properties for a commercial thermoplastic coating on a metal substrate at an economical cost. The coating needs the simultaneous capability of: developing suitable bonding to the metal substrate, economical production, having suitable pencil hardness, eliminating air entrapment, obtaining a high level of chemical resistance, and having the ability to withstand part forming without splitting.

BRIEF SUMMARY OF THE INVENTION

The invention is a laminating process which is directed toward economical production methods at scalable amounts of production which develop properties suitable for a product line with demanding chemical resistance properties. In particular, the product is capable of important key components of commercial properties such as adhesion, scratch resistance, chemical inertness, eliminating air entrapment, and part forming without failure.

BRIEF DESCRIPTION OF THE SEVERAL VIEWS OF THE DRAWING(S)

Figure 2:
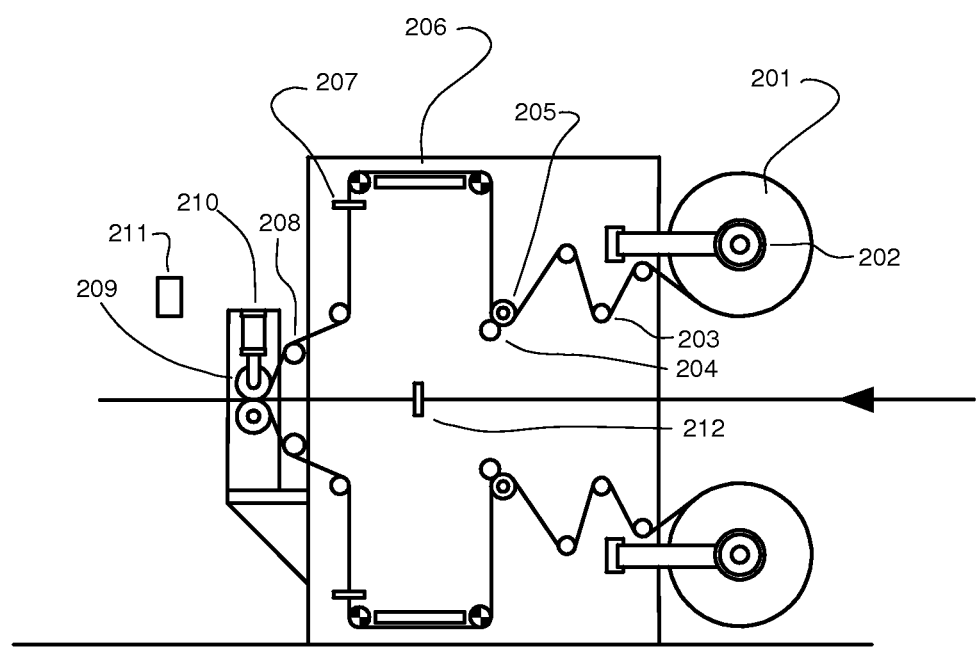
Figure 3:
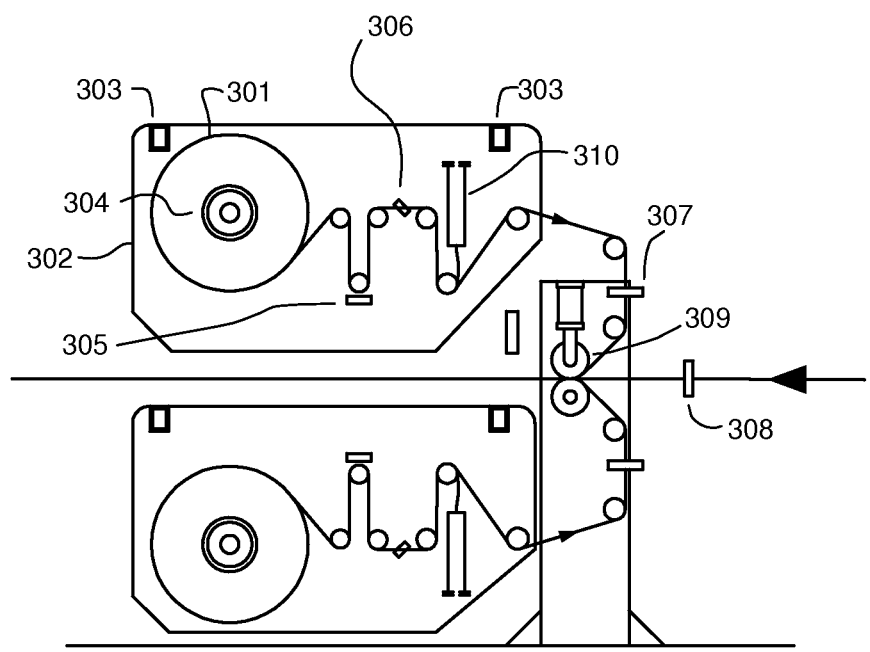
Figure 4:
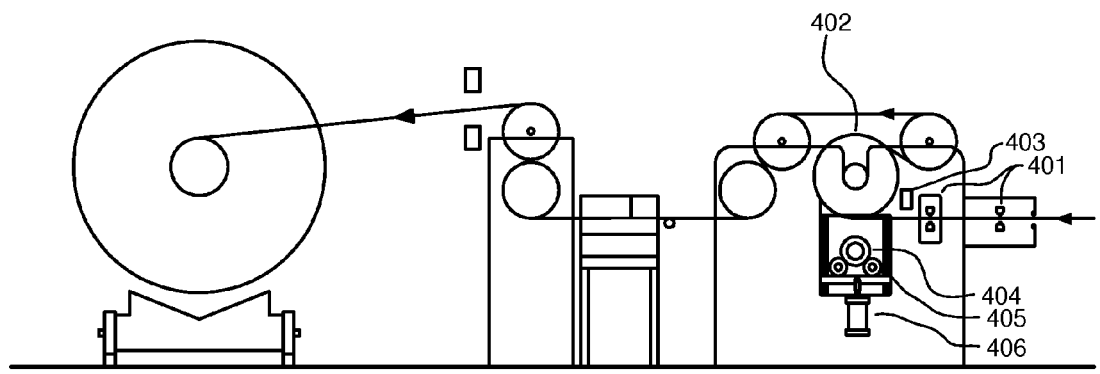
Figure 5A:
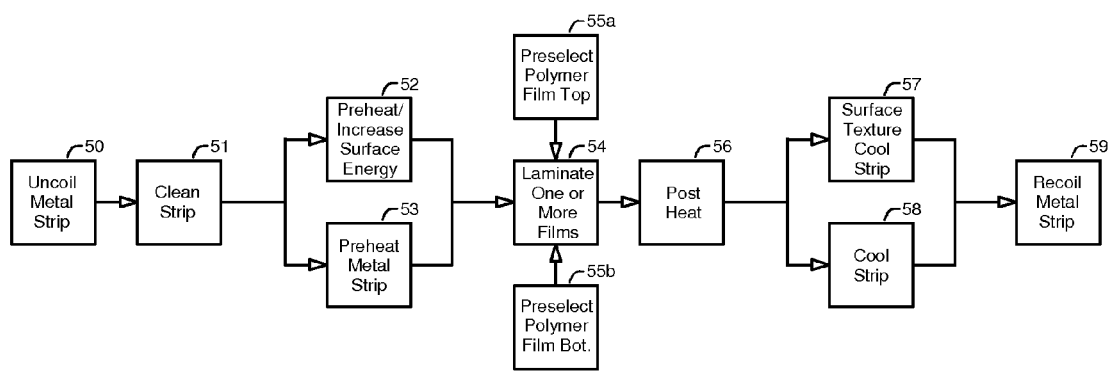
Figure 5B:
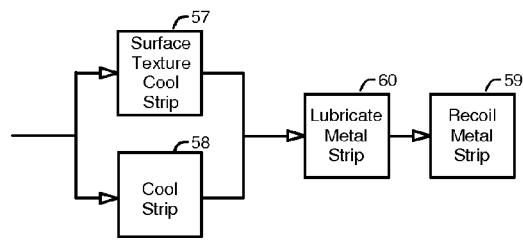
Figure 6:
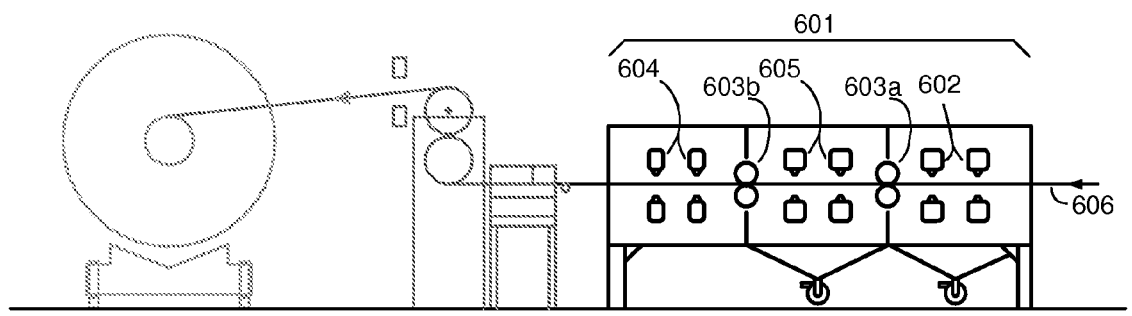
Figure 7:
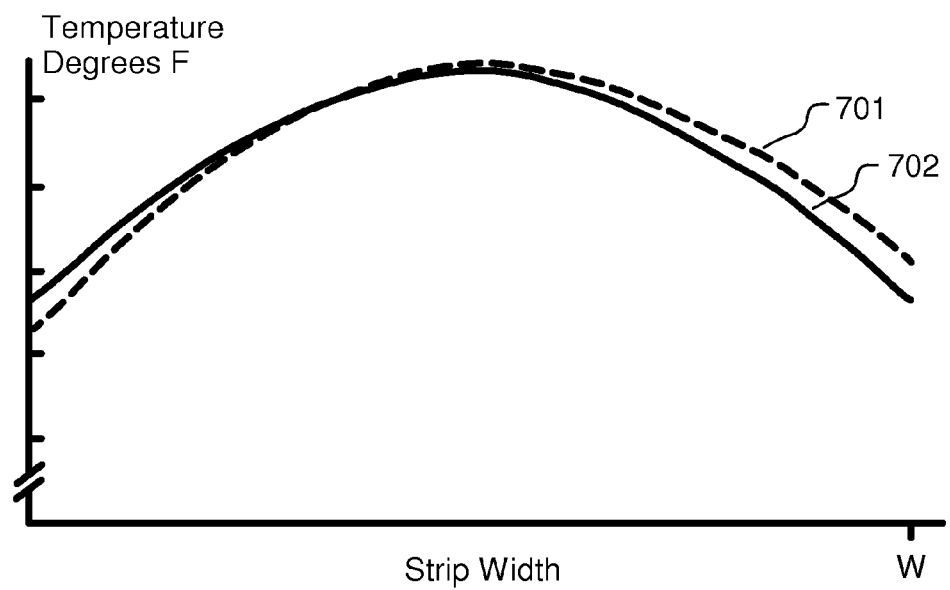
Figure 8A:
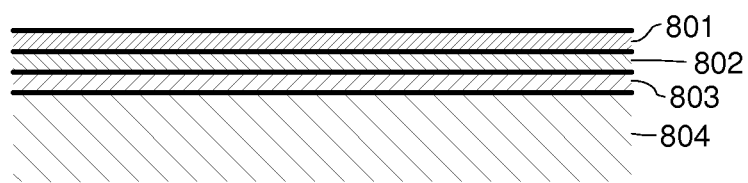
Figure 8B:
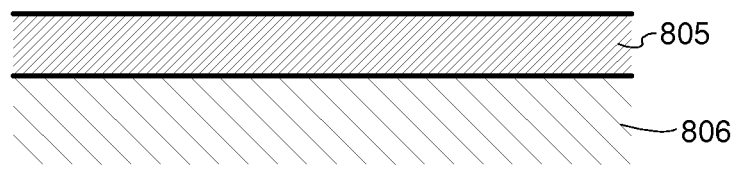
Figure 8C:
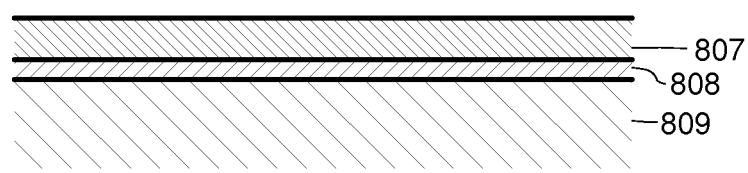
Figure 9:
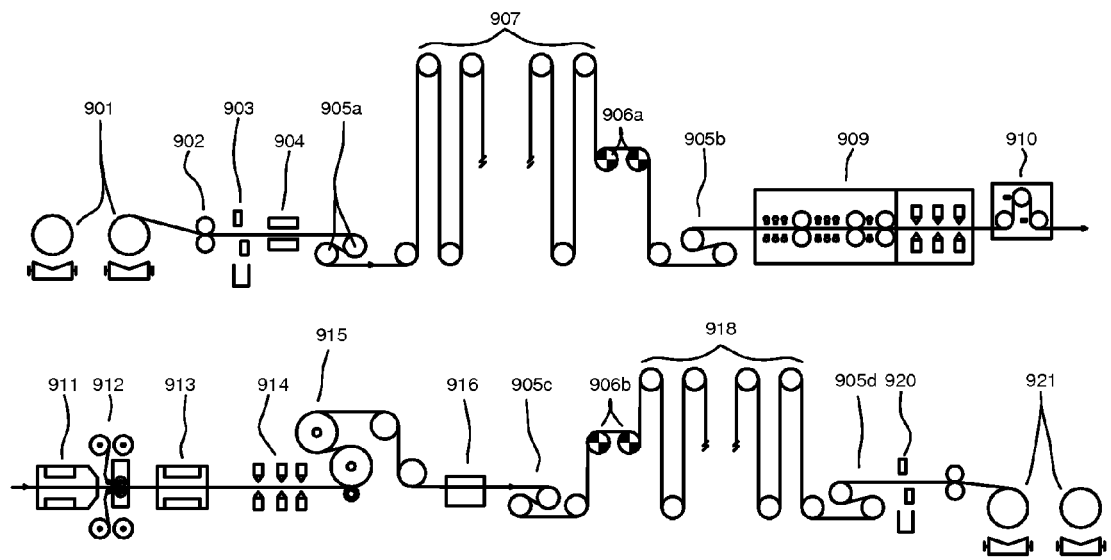
Figures 10A, 10B:
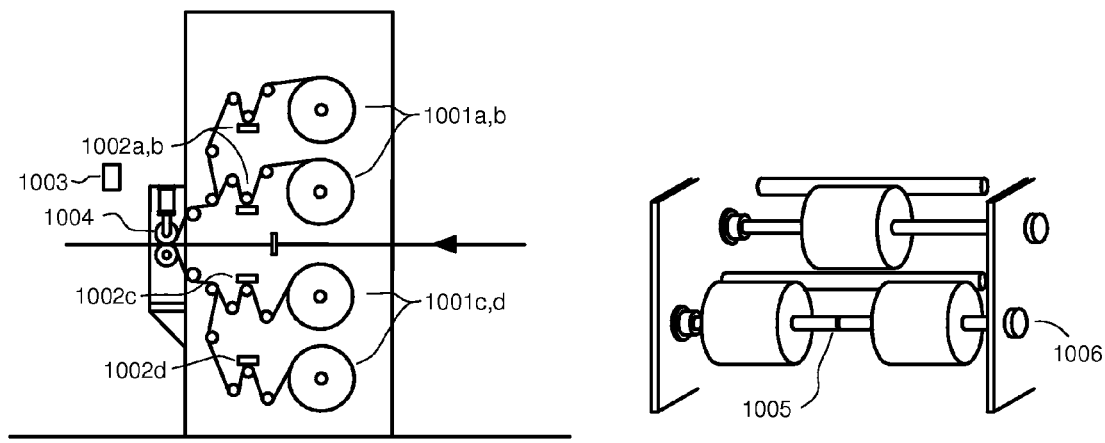

FIG. 1 shows an embodied production line.
FIG. 2 shows one embodiment of a laminating station.
FIG. 3 shows another embodiment of a laminating station.
FIG. 4 shows an embodiment of strip cooling where both forced air and contact with a cooling roll are used to cool the strip.
FIGS. 5A-5B show a general embodiment of the invention.
FIG. 6 shows an alternate embodied strip cooling.
FIG. 7 shows a temperature profile across the strip at the laminating nip due to edge cooling.
FIGS. 8A-8C show various embodied layer configurations.
FIG. 9 shows another embodied production line.
FIGS. 10A-10B show an example of running multiple film widths.

DETAILED DESCRIPTION OF THE INVENTION

The invention is a laminating process that utilizes a crystalline polyester film due to its unique composition as an affordable engineered polymer. In particular, essential commercial characteristics can be developed which are highly competitive to paint. Polyester is generally more affordable than other engineered polymers in the marketplace, and is chemically similar to many paints which are short chain polyesters admixed with cured epoxies.

When considering current pricing trends in thermoplastics, the better priced plastics tend to be polyethylene (high density, low density, linear low density), polystyrene, polypropylene, ABS, acetal homopolymer, and polyester (both PET and PBT). This is in reference to the types of polymer grades that are reasonably available in volume pricing that are extrudable at a commercial speed for a thermoplastic coating of about 0.5 to 8.0 mils thick. However, it has been found difficult to find satisfactory coating performance among many of the lower priced polymers, in particular, the polyolefins. High surface scratch resistance, in particular, has been elusive.

The higher priced polymers, such as Acrylic, Fluoropolymers, Liquid Crystal Polymers, Polyamide/imide, Polyarylate, Polyetherimide, Polyetherketone, Polyphenylene Sulfide, Polysulfone, Cellulosics, Polycarbonate and Polyurethane are financially unappealing. However, it is expected that these polymers can be applied with satisfactory results by using the teachings of this invention.

Table 1 shows a rough affordability ratio for the same coating thickness on a price per pound when additionally considering the polymer specific gravity. Although Table 1 could be shown as various ranges depending upon the polymer grades chosen, it is a rough average for a simplified view.

TABLE 1

| | |
|---|---|
| Polyethylene | 1 |
| Polypropylene | 1 |
| ABS | 1.1 |
| PVC | 1.3 |
| Polystyrene | 1.3 |
| APET | 1.4 |
| Acrylic | 1.4 |
| Polyester | 1.6 |
| Acetal | 1.9 |
| Nylon 6/6 | 2.0 |
| Polyurethane | 2.2 |
| Polycarbonate | 2.4 |

Biaxially oriented polyethylene terephthalate (also referred to as BoPET) is a thermoplastic polyester film made by stretching a film made from polyethylene terephthalate (PET) resin to create better properties such as tensile strength and superior chemical resistance by adding desirable crystallinity. BoPET is typically made in a process that begins with an extruded polyester film and is immediately quenched by a chill roll. In this initial condition, the polyester film is relatively amorphous with little crystallinity. To create a BoPET film, the solid film is stretched in the machine direction (i.e. down its length) and subsequently in the transverse direction (across the width) in a two-step process. In both steps the film is heated to a particular temperature, typically above 390° F., and dimensionally stretched three to four times in both directions.

Once the film has been stretched, it is then processed through an oven to create and set desirable crystalline properties. The end result is a biaxially oriented film with desirable mechanical and chemical resistance properties that are useful in a variety of markets, particularly the food and beverage can market.

Due to the high BoPET film melting point, previous methods of successfully laminating a polyester film made from a casting process with a lower melting point, were found to have a lower chemical resistance standpoint, but though lower it was satisfactory for some commercial markets. In an important embodiment of the invention, it was discovered that it was possible to laminate the BoPET film to a metal substrate at a post heat temperature lower than the BoPET film melting point, with and without use of a tie layer. In particular, the processing methods preserved desirable film crystalline properties in the finished product.

Crystallinity in a film is measurable by a Differential Scanning calorimeter (DSC) through measuring methods known in the polymer arts.

In some cases, it is desirable to have a continuous operation by utilizing strip storage rather than thread each individual coil as done in a batch operation. The line may be stopped for each coil and the coil ends spliced together, as is common on coil processing lines, and a looping tower or looping coil car employed. Also, a strip splicing or joining method may be employed with success, such as a stitching/stamping method as by Behlen Manufacturing Company (Columbus, Nebr.). Any downstream rolls with a narrow or closed gap, such as pinch rolls, may be opened briefly to let the splice pass through to avoid damage. Generally, splices do not affect or damage idler rolls in a coating operation provided proper care is taken. The pressure from the splice onto the rotating rolls does not cut into rolls provided the rolls are sufficiently tough. A disadvantage of adding looping towers to the line is the additional capital cost and lengthening the amount of threaded strip in the line. However, for higher speed lines, such as 200 fpm and above, strip storage provides important production advantages and operating economy.

It is important to eliminate air entrapment between the film and metal substrate to avoid the entrapped air from expanding in the post treat operation. If an entrapped air bubble is significant in size, it can expand enough to rupture through the film surface and allow metal exposure. Even if it is not large enough to allow metal exposure, it may be large enough to cause coating thinning and then lower the corrosion protection at the spot of the entrapped air. The substantial elimination of entrapped air is an important result of the invention.

For the purposes of this patent application,
i) a coating with an adhesion value of at least 43 ounces per inch width is interpreted as a classification of 4 or 5 by ASTM test method D3359 using a tape with an adhesion level of 43 ounces per inch.
ii) a coating that passes a pack test is based on visual observation of adhesion and corrosion in comparison to other products that are in commercial use. Minor cosmetic defects such as haze or blushing are not considered a failure.
iii) a coating with a pencil hardness of a minimum of 2B means 2B or harder as measured by ASTM test method D3363.

The conceived invention has advantages in chemical inertness. Polyesters, even in thin films of 0.0015" and less, have significant corrosion resistance capabilities.

For some markets, an embodiment is use a surface finishing pinch roll to imprint a desired surface finish onto the polymer surface while it is still in a softened state. The finishing rolls are preferably water cooled, but can be cooled by other means such as air. The roll surface finish can be used to control the film surface reflectivity, which in turn controls the surface gloss. This is a desirable outcome for some markets, in particular, where the gloss requirements are very low or very high.

Generally, a higher amount of crystallinity in the coating on the final metal laminate product is needed in order to develop a higher pencil hardness. Normally, the crystallinity is targeted according to a balance between brittleness, surface hardness, and chemical resistance. For example, a higher crystallinity without suitable elongation makes the polymer overly brittle, which causes stamping defects. The preheat temperature, and particularly, the post heat temperature in the post heat oven are important parameters to establish desired crystallinity to a value that is needed for a particular market. The post heat temperature is optimized for a particular film.

In the case of using a BoPET that is designed to be used in the can-making market, a film was discovered that balances adhesion, elongation, chemical resistance, gloss, and pencil hardness by selecting operating parameters at the biaxially oriented film line and also on the embodied metal substrate laminating line.

FIG. 1 shows a commercial laminating line for a flat rolled metal substrate. A payoff reel 101 with a motor for back tension uncoils a metal substrate, passes through deflector rolls 102, and continues to a cleaning section 103. The strip is then washed with a cleaning solution, such as an alkaline or soap solution, rinsed and dried. The strip then passes through a preheater 104 utilizing a controlled natural gas-air burner which uses an infrared (IR) temperature sensor 105 for control. In the preheater 104, the strip temp is raised to a level that will facilitate initial bonding of the film to the metal substrate at the laminator nip, and additionally, will raise surface energy to a minimum dyne/cm level of 45, and desirably, to a much higher amount, above 70. The minimum dyne/cm level has been found necessary to create an initial bond between the metal and film, and also to prevent air entrapment between the film and metal surface. In a preferred embodiment, the dyne/cm level is at least 70 to obtain a high quality coating.

The preheat 104 utilizes premix burner that provides preheating of the metal to at least 200° F., and preferably to a range between 320-430° F. in the case of a BoPET film. The preheat that is applied to the metal strip prepares the metal surface to receive the film without air entrapment, and also to establish an initial bond between the metal and the film. It has been found that there has to be at least some bond established at the laminating nip that will carry over to the post treating step. If the green strength (initial bond) is not properly created, the film will tend to lift off of the metal in the post treating operation. The post treating step then establishes the final commercial adhesive bond.

A temperature sensor 105 which measures the metal temperature is preferably utilized for temperature control of the preheat. It can be located immediately after the laminating station 106, or a laminating temperature sensor 108 can be used to control preheat 104 equipment, or both could be used in preheat temperature control.

A laminating station 106 provides preselected films for laminating to one or both sides of the metal substrate by pressing them against the metal strip using a pair of nip rollers 107. The nip rollers press the one or both films onto the metal substrate by use of a compressed air cylinder, hydraulic cylinders, screws, mechanical springs, or other mechanical force creating methods. Preferably the nip rolls are covered with a suitable covering to provide even nip pressure.

The metal-polymer laminate then proceeds to the post treating oven 109 where the strip is heated to a final bonding temperature. In the case of a BoPET film, a preferred bonding temperature has been found to be lower than the melting point of the film by up to 120° F., which preserves the film crystallinity. The temperature that provided excellent bonding was found to be in the range of 430-470° F. for the films tested, and also allowed for better chemical resistance properties.

The exit temperature from the post treating step is controlled by regulating the heating input and monitoring the exit temperature with a suitable sensor; such as an infra-red sensor 111. A mid-point temperature sensor 110 is optionally used to improve oven control. A small amount of nuisance smoke is a possible occurrence from the polymer, and is readily removable by vent ductwork if it occurs. The strip in the examples was heated by an infrared oven (as noted), but the strip can equally be heated by other means such as gas flame heating, convection, conduction, induction, electrical resistance, and a gas fired furnace.

The polymer metal laminate then proceeds to the exit cooling section where cooling is provided by air cooling knives 112 and contact with a cooling roll 113. In a preferred embodiment, a temperature sensor is used to control the amount of air cooling utilized. It has been found preferential to include air cooling to avoid issues with metal substrate wrinkles that occur on the contact cooling roll, but air cooling is not a strict requirement. An alternate embodiment is strip quenching via water sprays, wringer rolls, and an exit air blow-off.

An optional lubricator 114 is used to lubricate the metal laminate surface according to customer specifications. The strip is directed to a pair of exit deflector rolls 115 and onto a winding reel 117 which uses an edge position sensor 116 for a sidewall winding system.

FIG. 2 shows a close up of an embodied laminating station. A metal substrate has already been pretreated and had the surface energy elevated as explained in FIG. 1. Film from an upper film roll 201 with an attached rotary tension brake 202 unwinds film which passes through idler rolls and a tensiometer roll 203 to a trimming station where one or both sides of the film are trimmed by a score cute knife 204 and backup roll 205. The trim removal system is not shown. The tension brake 202 control is based on a tensiometer roll 203 measurement. The film is trimmed to match the metal substrate width to a desired tolerance. An offset film steering guide 206 is used to position the film via a film position sensor 207 in order to match the film position to the metal substrate steel position as measured by a metal position sensor 212. A bowed roll 208 just before the nip rolls 209 provides for wrinkle elimination just before the laminating of the film onto the metal substrate.

A pair of air cylinders 210, provide the needed force to create a pressure between the laminating film and metal substrate. An IR temperature sensor 211 immediately after the nip rolls measures the laminating temperature. A similar matching system is utilized for the lower film roll.

FIG. 3 is an alternate embodiment for film edge positioning, showing a close up of a preferred embodiment of a laminating station. A metal substrate has already been pretreated and had the surface energy elevated as explained in FIG. 1. Film from an upper film roll 301 with an attached rotary tension brake 304 unwinds film which passes through idler rolls and a tensiometer roll 305 to a trimming station where one or both sides of the film is trimmed by a razor slitter 306. The tension brake 304 is controlled by the tensiometer roll 305 measurement. The film is trimmed to match the metal substrate width to a desired tolerance. The film roll, slitting station, idler rolls, and tensiometer roll are mounted on a shifting frame 302 with guide rails 303. The shifting frame 302 is used to position the film via a film position sensor 307 in order to match the film position to the metal substrate steel position as measured by a metal position sensor 308 just prior to the nip rolls 309. A trim removal vacuum tube 310 removes film trim from the slitting station. A matching system is utilized for the lower film roll.

The shifting frame 302 design is advantageous, primarily by using a simplified control system. If sufficient shifting force is created, with low backlash and low shifting friction, a highly accurate positioning system is obtainable.

FIG. 4 shows a detailed view the cooling embodiment shown in FIG. 1. Air nozzles 401 are used to cool the metal-laminate to a desired level as measured by infrared sensor 403. The air flow through the nozzles is regulated by a variable speed motor attached to an air pressure fan (not shown) by regulating air pressure in the nozzles as function of the infrared temperature sensor 403. In one alternate embodiment, the air pressure is controlled by a control valve that feeds air to the nozzles (not shown). After the metal-laminate is partly cooled by air, it is directed to a contact cooling roll 402, often referred to as a chill roll, which internally cooled by water. A water pumping and temperature regulation system (not shown) controls the water temperature and throughput through the cooling roll. A chiller (not shown) or an outside temperature exchange unit (not shown) is used to control the cooling water temperature. As an alternative embodiment, cooling of the metal laminate is completely done by the air nozzles and a chill roll is not used.

A surface finishing roll 404 with two lower contact cooling rolls 405, is optionally used to control the surface finish of the metal-polymer laminate if the film is at a temperature that is soft enough to receive an imprint from the roll. The contact cooling roll 402 is optionally finished to a desirable surface finish so that it also imprints a finish on the surface of a polymer. An air cylinder 406 lifts the roll set and provides a controlled pressing force.

FIG. 5A is a more generalized expression of the invention. Each step will now be described.

Step 50: Uncoil Metal Strip. A continuous line with strip ends connected in line or a batch line with the processing line stopped for a new coil.

Step 51: Clean Strip. One or both metal surfaces are cleaned by a cleaning solution, followed by rinsing and drying sections. It is preferred to utilize a water based cleaning solution that is either an acid, alkaline, or soap solution. It is desirable that the cleaning solution does not deposit any residual chemicals from the cleaning solution, such as surfactants or emulsions. If the cleaner is well designed, the surface energy is raised by this processing step, and there are no spots on the surface.

For a spray wash, spray rinse, and blow-off type cleaning system, the cleaning water system is managed by the addition of cleaning solution to the washing section. The tank liquid levels are controlled by first adding makeup water to the rinse section. Water from the rinse section is then added to the cleaning section when the level lowers.

The surface to be coated is preferably free of debris, oils, water, dirt, and other surface contaminates for adhesion. The metal substrate could be conversion coated, pretreated, or coated with an organic primer, but these kinds of treatments are not required for initial adhesion at the laminating roll. For some applications, these kinds of pretreatments significantly enhance the ability of the metal to provide corrosion protection.

In line surface cleaning of the metal substrate is desirable if surface contaminates are in place to disrupt the bond between the polymer and the metal surface. In line surface cleaning equipment comprises any of dip tanks with suitable cleaning solutions, spray systems, and electrical grid cleaning tank systems. It has been found highly desirable, for commercial reasons, to include in line cleaning for the metal strip. The most reliable levels of commercial adhesion were not provided on a line without a cleaning section unless the metal substrate was free of oil and surface debris. A cleaning section is not a strict embodiment of the invention as the need is metal substrate dependent. Levels of stamping and chemical success were found to be lacking in reliability due to lower than desired yields from a coated coil when a cleaning step was omitted.

Step 52: Preheat/Increase Surface Energy. The surface energy of the metal strip surface to be coated is increased by controlled flame (i.e. air to gas ratio is controlled), corona, or plasma. An important and significant improvement of the invention is to utilize inline equipment to improve the surface energy of the metal substrate prior to the laminating nip step. Alternate methods include ozone treatment, ultra-high frequency electrical discharge, UV, or laser bombardment. In one embodiment the surface energy is raised to a minimum dyne/cm level of 45 for adhesion. The invention has found that this kind of pretreatment (along with preheating) avoids difficulties reported by others with air entrapment. No air entrapment of any kind was observed on a line laminating at speeds up to 100 fpm, even when examined closely under a microscope. In a preferred embodiment, the surface energy level is raised to at least 70 dynes/cm.

Cleaning could also be done on a separate line.

Surface energy levels out of the exit of a cleaning unit were measured at values above 70 dynes/cm. This is often referred to 'water wet' where a drop of distilled water will easily spread out and remain flat on the surface, i.e. does not bead up. Surface energy values at this level are sufficient to allow the metal strip and film to bond without additional energy surface pretreatment. However, it may be necessary from a reliability standpoint to include additional surface energy pretreatment after a cleaning section, especially if the cleaning section has performance issues.

Such surface energy raising equipment comprises a controlled flame (i.e. air to gas ratio is controlled), corona, or plasma. It is used in combination with a preheating step of the metal substrate to at least 200° F., and preferably to at least 250° F. to eliminate air entrapment.

Step 53: Preheat Metal Strip. In the preheater the strip temp is raised to a level that will facilitate initial bonding of the film to the metal substrate. The metal strip is preheated to a temperature of 250 to 430° F., depending upon the film used. Possible preheat methods include: flame fired oven, infrared oven, flame impingement, convection oven, induction furnace, electric resistance heating, electric heating coils, gas fired furnace, and radiant heating. As already noted, this step can be done simultaneously with step 52. It is also possible to raise the dyne level by a well-designed and operating surface cleaning step 51.

In the case of BoPET, the polyester films tend to have melting points from 480 to 510° F., depending upon the type of film, as well as additives and mixtures added into the polyester. Depending upon the type of layer next to the substrate, metal preheating temperatures ranged from 270-430° F. One embodiment of the invention is to maintain the preheating of the metal strip below the melting point of the film layer in contact with the metal.

In one embodiment of the invention, the control of the gas to preheat/pretreat burner incorporates a line speed reference along with a feedback temperature. This ensures that the line is capable of correctly controlling the preheat temperature for various changes that are needed, and to allow a higher production rate after initial settings are established at a lower speed. In another embodiment, two temperature sensors, on after the laminator and one after the preheat are used.

Step 54: Laminate One or More Films. Laminate at least one side of the metal strip by use of a roll pair to establish a metal polymer laminate. Either one or both of the rolls are optionally heated, but this is not a requirement. Heating the nip roll avoids startup issues due to a cold roll. The nip rolls could also be cooled if a particular temperature is desired. A second roll pair is optionally utilized, if desired, for laminating a second film in sequence to the first pair. If both sides of the strip are to be laminated, a surface pretreatment is performed on the second side to ensure the surface energy of the second side is elevated prior to laminating (if needed), as well as a heater (if needed) to obtain the proper preheat temperature at the second roll pair.

If two films are applied, each side of the metal substrate may have a distinct film or the same film. The second film is typically applied simultaneously with the first. As conceived in the invention, at least one side uses a biaxially oriented film. A second applied film does not have to be biaxially oriented, so a variety of films that provide useful commercial properties could also be bonded to the metal substrate.

If roll heating is used, the temperature of the rolls will generally be set to match the preheat temperature of the metal strip, but this is not a strict requirement, depending upon the type of film being laminated. It has been found that the metal substrate feeding into the laminating nip will have a strong tendency to drive the laminating rolls to the strip preheat temperature, unless cooling or heating is provided.

Generally, a threshold nip pressure is required to establish an initial bond between the film and metal substrate without air entrapment, as well as the needed pressure to ensure that the metal substrate is flat in the nip so that the film is allowed to contact the metal. However, air entrapment was not found to be correlated to nip pressure at the line speeds studied (i.e. below 100 fpm).

It is desirable to have the ability to continuously run multiple rolls of film in sequence without stopping if metal strip storage is added to the laminating line. In this case, the ability to switch films to different colors and widths is a distinct production advantage. This adds capital cost and operational complexity to the laminating line, but it also provides an overall lower operating cost and a better operation. It is not financially appealing to stop a line in the middle of a run for the sake of starting a new film roll, as a customer will find yield losses and off specification material objectionable in a finished coil. A new film roll can be spliced to a previous running coil "on the fly", by using such methods as taping ends of film rolls together and pre-rotating the next film roll. It is less desirable to add looping towers to a processing line to make the processing of steel coils continuous if the rolls of film are not continuous as well.

In one embodiment, the bonding of the film to the metal substrate is at least partially caused by a chemical bond. For the right preheat and post heat temperatures a BoPET film will bond to the metal substrate at a very high commercial level.

As an alternate embodiment, the film trimming knives may be moved to match the position of the metal substrate on the line if there is any off tracking from the line centerline, rather than utilize a film steering system. A metal substrate edge sensor may be employed to monitor any metal substrate off tracking, and reposition the knives to ensure the film edges match the metal substrate edges. In this case, sensors are preferably added to the knives or a ball screw is employed with a shaft encoder. Edge sensors include devices based on light, capacitance, LED, air, CCV, lasers, and others. In a preferred embodiment, the substrate edge is sensed within 0.005" and the knives are positioned by a control system so that the film with is matched within ±0.015" of the metal substrate. However, in commercial practice, a metal exposure of up to 0.125" may be acceptable for some markets which requires less demanding film position control.

In a commercial setting, it is a preferable embodiment that the overall control of the film width and position is maintained so that there is very little film overhang or that the exposed metal does not exceed about 1/32 of an inch on either edge. In another embodiment, bare metal on the edge is up to 1/8 of an inch.

It is a significant embodiment of the invention to be able to control the width of the film at the laminating process. The production of films can be a very expensive undertaking, relative to other operating costs, and the ability to match the width of the film is an important matter for best overall operating costs.

Polymer films are expensive to make when they are thin, as the operation of a cast film line is generally a fixed amount per hour, and the width of the cast film then becomes an important factor. It is preferable to maximize the width of the film at the film maker's facility in order to improve costs, especially when exact steel widths are unknown or difficult to predict. It is especially important not to undersize the film width for a particular order when running multiple widths on the cast film line with a single large width.

In the case of laminating a BoPET film, when preheating the metal substrate above 400° F., other factors begin to require consideration, such as economics and equipment capability. It is more expensive to operate laminating rolls in the higher temperatures. Their life is lower and their replacement cost is higher. Also, preheating the metal substrate can create a situation where the film begins to stick to the laminating rolls rather than the metal substrate. It is preferable to maintain the preheat temperature at a level that avoids this complication. It was found that temperatures of 320 to 430° F. were used to create the green strength, depending upon the type of BoPET film used. In one example, the nip temperature ranged between 375 and 410° F. Too low and there was insufficient bonding, too high and the film started to adhere to the nip roll and cause a build-up of film on the nip roll.

The overall goal of film handling is to present the film(s) at the nip roll without wrinkle, at the correct width and position. Film trimmings from each side are removed by vacuum or other mechanical means such as winding it up. The film cutting knives may be any of score cut, razor cut, or shear slitting.

Step 55a,b: Preselect Polymer Film Top/Bottom. At least one of the films is predominately BoPET, that is, at least 50% by weight. Tie layers, colors, and various additives necessary for color dispersion may be added to the polyester which would lower the percentage by weight of polyester. Also, admixed compounds that increase pencil hardness, provide surface lubrication, provide better processing, provide UV resistance, or create desired gloss are optionally added.

In another embodiment, a tie layer is utilized to create an enhanced bond, such as PETG, or a mixture of PET and PETG. Other possible tie layers, but not restricted to, include PETI (polyester ionomer), and a carboxyl acid modified PET.

In one particular embodiment, PETG, or polyethylene terephthalate glycol, is used as a tie layer that offers higher pencil hardness and coating toughness in certain situations. It was found through practical experience that certain stamping operations performed decidedly better when a PETG, or mixture of PET & PETG, tie layer was used.

The type of film used in this invention is generally conceived as BoPET but this is not the only film that will provide desirable commercial features. Other films, such as polycarbonate, are capable of achieving pencil hardness and adhesion, and chemical resistance for at least some commercial products.

Step 56: Post Heat. The metal-polymer laminate is post heated to a final bonding temperature that is lower than the melting point of the BoPET film. For a multi layer film, the final bonding temperature may be at (or higher) than the tie layer melting point. But it will be below the bulk or top layer melting point so as to ensure the overall coating will provide chemical resistance and pencil hardness.

Post heating ovens are (but not restricted to): induction, flame fired, infrared, flame impingement, convection, electric resistance heating, electric heating coils, and radiant heating. An infrared sensor is preferably installed to monitor the exit temperature to ensure good control. Other mid oven temperatures are optionally used to provide improved oven control. In an alternate embodiment, the oven heating across the width is also controlled to achieve a desired metal laminate temperature profile at the exit of the oven.

The post treating step ensures that the process provides a reliable commercial bonding between the polyester film and the metal substrate. Adhesion values at or above 43 ounces per inch width as measured by a cross hatch adhesion test were observed. It is understood that the preheat of the metal is sufficient to cause the tie layer to create an initial bond at the laminating nip, if a tie layer is used, and cause the contact surface of the film to become very chemically active for bonding purposes. The conceived invention is designed to ensure the reliability of the lamination process by including a post treating step in the coating process. However, based on laboratory measurements this is not a strict requirement in order to create a coating that has adhesion at a commercial level.

In another embodiment, the post treating oven control incorporates the effect of line speed, utilizing a curve (if needed or desired) that includes any efficiency effects that vary with the line speed. This ensures that the line is capable of controlling the post treat temperature for various speed changes that are needed, and to allow a higher production rate after initial settings are established at a lower speed. For example, if an induction or infrared oven system is used, the power input is regulated based on line speed. If a gas fired system is used, the gas BTU input rate is varied with the line speed.

For the post treating operation, it is important that the polymer coating is carefully controlled to be inside the edges of the metal strip or within a close tolerance. The heating on the overhanging polymer is likely to cause melting or burning of the overhanging polymer. This can cause operational problems such as smoking, polymer dripping, and minor flames which may cause unsafe or unclean operational practices. However, by controlling the polymer film position within the width of the metal strip, and applying it in the laminating step to have green strength across the strip width, then the post treating step will not have problems caused by overhanging polymer.

Step 57: Surface Texture/Cool Strip. After the post treating step, a surface finishing step is optionally applied to one or both surfaces of the polymer if needed for the markets the metal-polymer laminate is being sold to. A pinch roll is preferably used to apply a surface finish while the polymer is still in the softened state. The surface finish transfer is a percentage copy of the roll finish, depending upon metal-polymer laminate temperatures. The pinch roll pair are cooled to ensure the polymer does not adhere to the rolls. The cooling effect from the contact cooling roll prepares the strip for winding and an optional lubrication step (not shown).

Step 58: Cool Strip. After the post treating step, cooling of the metal-polymer laminate is performed at a rate that allows the polyester film to maintain desired crystallinity. The cooling is preferably, but not restricted to, forced air, a liquid spray system, contact cooling, or a combination.

If a BoPET film is used, the function of the exit cooling section is to lower the metal-polymer laminate temperature rapidly and not at a designed rate to achieve a particular coating crystalline end result. In the exit cooling section, the polymer will cool down to the point where the crystalline structure is established based on the incoming film crystallinity in cooperation with the preheating and post heating steps.

One important benefit of rapid cooling is improved gloss and clarity in the final product. Gloss tends to come from surface and haze from the polyester type (grade/mix/etc.) used in the coming film.

Step 59: Recoil Metal Strip. After the cool down step, the metal-polymer laminate is a finished product that can be recoiled at a temperature that will not cause problems with lap to lap shrinkage or slippage. Generally, temperatures less than 150° F. are preferred to ensure there are no winding or storage problems.

As an alternate embodiment, the finished product could be cut into sheets in line rather than wound up into a coil.

Optional Step 60: Lubricate Metal Strip. FIG. 5B shows a lubrication step after cooling the metal-polymer laminate. This is required if the customer desires the surface to be lubricated, although it is not necessary for adhesion and chemical resistance.

FIG. 6 shows an important embodiment of the invention where a cleaning section 601 is used to clean the metal substrate 606. A series of recirculating liquid spray nozzles 602 are used to wash the metal substrate 606 with a water based cleaning solution, such as a hydroxide or soap solution, to remove oils, metal fines, dirt, loosely fitting metal oxides, etc. from the metal substrate surface. An acid based or soap solution could also be used depending upon the substrate and dirt. The metal substrate then passes through a first set of wringer rolls 603a and into a set of recirculating water rinse nozzles 605. The rinse water is used to remove the washing solution from the metal substrate surface. The metal substrate then passes through a second set of wringer rolls 603b and into a drying area where air blowoffs 604 are used to remove surface water. The metal substrate then exits the cleaning section 601 with the surface clean and dried, as measured by high dyne values.

FIG. 6 is an illustration of one type of cleaning unit. Other types of cleaning systems are possible, including solvent based systems. It is preferable that any system used does not scratch the strip, and to that end, brushes are not favored for cleaning unless the dirt loading is severe or difficult to remove.

FIG. 7 shows a graph of the temperature distribution out of the preheater if sufficient care is not taken to maintain the strip temperature evenly across the strip. A solid line 702 shows a symmetrical temperature profile and a dashed line 701 shows a non-symmetrical temperature profile. The temperature profiles are due to heat losses from the strip by being exposed to cool air. A long ambient air envelope around the strip will cause this type of cooling effect, which comes from too long a distance between the preheat and the laminator. It was found necessary to add additional heating on the strip edges to compensate for this effect utilizing temperature sensors and heating control systems. A poor temperature profile (more than 20° F. difference from edge to center) is likely to cause difficulties with green strength across the strip width and film edge bonding. In an embodiment of the invention, the laminator is placed close to the exit of the preheat equipment. In another embodiment, an insulating tunnel is provided to transport the strip to the laminator nip rolls from the preheat. In another embodiment, the strip temperature is measured at the edges and heating is provided by heating equipment to raise the temperature of the edges to within 10° F. In one embodiment the temperature profile is controlled to within 20° F. across the width, in a preferred embodiment, the temperature profile is controlled to within 10° F. of the center. Control for edge heating can come from the preheat equipment, or, additional equipment in between the preheat oven and the laminator rolls. In an example of satisfactory control, flame and infra-red together and separately were both used to improve the temperature profile of the metal substrate just before the laminating rolls.

FIGS. 8A-8C show various film-metal substrate layer configurations. In FIG. 8A, a metal substrate 804, such as tinplate or tin free steel (TFS), is coated with a film utilizing three layers. The tie layer 803 (or bonding layer) is utilized to facilitate bonding between the film and the metal substrate. In one embodiment, the tie layer utilizes an amorphous polymer, such as a PETG, to improve the bonding. In another embodiment, the tie layer is a PET with a defined non-crystalline structure, such as amorphous, that has been created separately from the bulk layer 802 and top layer 801. It is possible to create polyester film structures with different crystallinity at different layers in the film by utilizing different extruders and resin grades.

FIG. 8B shows a metal substrate 806, such as tinplate or tin free steel (TFS), coated with a single layer film 805. FIG. 8C shows a two layer film where a tie layer 808 with a bulk layer 807 (could also be called a top layer) is bonded to a metal substrate 809.

FIG. 9 an example of a continuous line. It is generally conceived that the process will be continuous (such as shown in FIG. 9) or a batch process (such as shown in FIG. 1). In a continuous line, looping (strip storage) towers can be used at each end of the line, or only at one end of the line, such as the entry end.

As stated previously, the major processing sections are cleaning, raising the surface energy (if needed after cleaning), preheating, laminating, post heating, and cooling. The process section would include needed control for processing parameters, such as temperature, and line control that would marry the film and processing parameters for the desired commercial end result.

The steel material handling sections comprise tension control units, steering units, film unwinding/rewinding, storage towers (if used), splicing equipment, idler rolls, and shearing equipment.

Line support equipment and processes are also utilized, which includes water cooling systems, air compressors, hydraulic systems, venting equipment, heating and cooling equipment, control systems, operator stations, electrical control systems, water supply systems, electrical and gas supply systems, testing equipment, coil handling equipment, cranes, order entry equipment, tagging and inventory control, data collection systems, etc.

As shown in FIG. 9, the film is unwound from one of two payoff reels 901 and then fed through threading pinch rolls 902 to an entry strip shear 903. Here the strip is sheared in readiness for splicing 904 by a welder, joiner, or other strip connecting means. The strip then goes through an entry looping tower 907. A pair of bridle rolls 905$a,b$ provide tension control on either side of the entry looping tower 907, and a steering roll 906$a$ provides strip tracking control. The strip proceeds through a cleaning section 909 which is an alkaline cleaner, rinse, and air blow-off. The strip is optionally pretreated for surface energy by 910 if needed to raise the surface energy of the metal strip. The strip is then preheated by a preheat station 911 to raise the metal temperature to a laminating temperature. The strip then enters the laminating station 912 where one or two films are bonded to the metal strip. The strip proceeds to a post heat oven 913 where the metal film laminate temperature is raised to a final bonding temperature. Air blow offs 914 after the post heat oven provide optional initial cooling. Twin contact cooling rolls 915 provide additional cooling of the metal film laminate in preparation of winding the finished product. An optional lubricator 916 is used if a customer desires lubrication on the metal-laminate surface. An exit looping tower 918 provides strip storage for the winding reels 921. A pair of bridle rolls 905$c,d$ provide tension control on either side of the exit looping tower 918, and a steering roll 906$b$ provides strip tracking control. An exit shear 920 cuts the metal strip just before the winding reels 921.

The invention is generally conceived as a one or two sided coating process. It is preferably performed in a single pass for best line and operational efficiency. However, one side at a time could be coated under some circumstances by choice, if equipment were not functional, or if multiple layers of film were to be placed on top of each other. Under such circumstances, the invention could be adapted to the situation by uncoiling the metal substrate, pretreating the appropriate side(s), preheating, laminating, optionally post treating, cooling, and winding up on a winding reel. Then the work in progress coil would then be uncoiled a second time, and coated with film according to the teachings of the invention through a processing line a second time on one or both sides. In these embodiments of the conceived invention, multiple films could be laminated in sequence on the same side by use of multiple pretreating, preheating, and laminating steps prior to post heating by adapting the teachings stated so far.

As another embodiment of the invention, multiple narrow films can be applied to the metal substrate. This is an important embodiment for some markets where parts will be cut out and bare metal areas are needed for welding seams. In particular, a three piece can body with a side welded seam may pre-coated on a wide metal tinplate by coating multiple film widths that are separated by a small gap, such as between 1/16 to 3/4" wide.

For multiple film coating, the films can be formed from a single film which is slit on line and the individual films are separated by gapping methods, such as by steering each film or by utilizing a bowed roll. Alternately, the wide film is pre-slit off line and the individual coils are mounted and gapped on one or more shafts. They are then fed into the laminator. Both methods are capable of providing the desired gap and tolerance needed.

FIGS. 10A-10B show an embodied method of applying multiple films to one or both sides of the metal substrate. As conceived, a multi-roll application provides for spaces between the applied film which would allow the finished product to have uncoated spaces between applied films. In FIG. 10A, multiple film rolls 1001$a,b,c,d$ are applied to the metal substrate and are spaced by gaps in between the film rolls so as to provide bare metal between the rolls and on the edges. In one embodiment, each film incorporates a tensiometer 1002$a,b,c,d$ to measure the tension so as to control the tension in each film. As before, a temperature sensor 1003 after the laminator measures the coated metal temperature to ensure that the initial bond (green strength) is established. Nip Rolls 1004 provide for laminating each individual film simultaneously to the metal strip. It has been observed that a narrow film will remain on the metal substrate in the same position and tolerance as it is laid down at the laminating nip.

In FIG. 10B, a shaft brake 1006 is used to control the overall tension of the film unwind shaft. However, in an alternate embodiment, individual film rolls are provided with individual tension by separating the shaft into different tension groupings, such as by a break 1005 in the shaft. A tension controlled shaft break could be provided on each end of the rolls. Alternately, the film rolls could rotate on cores against a stationary shaft and individual tension is controlled by slipping/friction methods. Mechanical means, such as compressed air and mechanical levers, push rods, and brake pads, can also be used to provide individual tension on each film roll.

It is desirable to provide individual film tension and a minimum length from the film roll to the laminating nip to ensure good tracking. Also, tension control will help to establish consistent film width tolerances at the laminating nip by reducing changes in width due to stretching.

It was found that laminating a much narrower film, relative to the metal strip width during trials, provided satisfactory adhesion and performance from edge to edge of the film. In particular, the edges of the film bonded without defect to the position it was placed on the strip, with no discernable performance difference across the film width, as measured by adhesion and appearance.

The examples following were run without any visible air entrapment between the metal substrate and the film. Air entrapment was not visible even when viewed under magnification capable of seeing bubbles as small as 0.5 micron in diameter.

Laminate Example A: A film and tin free steel laminate used a film comprising a 0.9 mil white/0.6 mil clear biaxially oriented multilayer PET structure. Film on the inside of the can was a two layer structure; a bulk layer and a top layer. The bulk layer was amorphous polyester blended with the PET and the top layer was PET. The overall thickness was 0.6 mils and the color was clear. The outside of the can was a three layer structure; a tie layer, a bulk layer, and a top layer. The tie layer was an amorphous polyester blended with PET, the bulk layer was PET mixed with white pigment, and the top layer was PET. The overall thickness was 0.9 mils and the color was white. The bulk layer melting point of both films was approximately 480-500° F.

The steel substrate was a tin free steel (TFS) 0.013" thick. Adhesion of the film to the steel was acquired through the thermal lamination process as described within and required no additional adhesive layer. Specifically, the steel was uncoiled and passed through a wash process according to the teachings of this invention, by a mildly alkaline aqueous solution, then rinsed and dried using blowoffs. Following the cleaning process the steel was flame treated to raise the surface energy and the temperature to between 400-425° F. The film was brought into contact with the steel by means of a pair of nipped rolls forming an initial lamination bond of the film to the steel. Subsequently the film/steel laminate was passed through an IR oven heating the laminate to an exit temperature of 440-450° F. The film/steel laminate was reduced in temperature by air knives and a contact cooling roll to reduce the laminate to a rewinding temperature. The film/laminate was checked for adhesion using a cross hatch adhesion test using a tape exceeding 46 ounces/inch. The crystallinity of the film was maintained to a commercially acceptable level by the process as evidenced by the packed can testing results. The pencil hardness was H. After processing, the film/steel laminate exhibited good formability during drawing processes and the film maintained excellent adhesion to the steel throughout third party drawing and retort processes.

A number of can ends were tested for various products, by double seaming them to an aerosol can and testing for corrosion and delamination at an elevated storage temperature (except for whipped cream which was cold). The results are in Table 1—Pack Tests after 90 Days:

TABLE 1

| Product Variable | Can End Observation | Overall Condition |
|---|---|---|
| Whipped Cream | No Corrosion/Delamination | Good |
| Cooking Pan Spray | " | " |
| Magic Sizing | " | " |
| Starch | " | " |
| Hair Mousse | " | " |
| Hairspray | " | " |
| Tub & Tile Cleaner | " | " |
| Brake Cleaner | No Corrosion/Delam (Film Slightly Cloudy) | " |
| Duster | " | " |
| Scrubbing Product | " | " |
| SeaFoam | " | " |
| Acetone | No Corrosion/Delam (Film Cloudy) | " |

Based on the testing and observation of the coating after storage, as well as the complete success of stamping the can ends, the testing company concluded that the metal laminate was commercially acceptable. Specifically there was no significant corrosion or delamination observed by close inspection of the can ends, nor were there any stamping defects.

Laminate Example B: A film and tin free steel laminate used a film comprising a 0.6 mil clear/0.6 mil clear biaxially oriented multilayer PET structure. Film on the both sides of the can was a two layer structure; a bulk layer and a top layer. The bulk layer was amorphous polyester blended with the PET and the top layer was PET. The overall thickness was 0.6 mils and the color was clear. The melting point of the bulk layer of the film was approximately 480-500° F.

The steel substrate was tin free steel (TFS) 0.008" thick. Adhesion of the film to the steel was acquired through the thermal lamination process as described within and required no additional adhesive layer. Specifically, the steel was uncoiled and passed through a wash process according to the teachings of this invention, by a mildly alkaline aqueous solution, then rinsed and dried using blowoffs. Following the cleaning process the steel was flame treated to raise the surface energy and the temperature to between 400-425° F. The film was brought into contact with the steel by means of a pair of nipped rolls forming an initial lamination bond of the film to the steel. Subsequently the film/steel laminate was passed through an IR oven increasing the laminate to an exit temperature of 440-450° F. The film/steel laminate was reduced in temperature by air knives and a contact cooling roll to reduce the laminate to a rewinding temperature. The crystallinity of the film was maintained to a commercially acceptable level by the process as evidenced by the packed can testing results. After processing, the film/steel laminate exhibited good formability during drawing processes and the film maintained excellent adhesion to the steel throughout third party drawing and retort processes.

For Laminate Example B, a number of can ends, were attached to food product cans and tested for corrosion and delamination at an elevated storage temperature for a variety of packed products. The results after six months were considered to be completely commercial by a $3^{rd}$ party testing company. Based on the testing and observation of the coating after storage, as well as the complete success of creating the can ends, the testing company concluded that the metal laminate was commercially acceptable. Specifically, there was no significant corrosion or delamination observed by close inspection of the can ends.

While various embodiments of the invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. Processing steps for laminating a metal substrate with a polymer film to create desirable simultaneous commercial properties comprising:
   a. processing a metal substrate on a processing line, wherein said metal substrate is flat rolled,
   b. cleaning a first major side of said metal substrate,
   c. increasing the surface energy of said first major side by at least one of:
      i. said cleaning of said first major side, and
      ii. surface energy treatment equipment,
   d. preheating said metal substrate to at least 200° F.,
   e. preselecting a biaxially oriented first film for bonding to said first major side,
   f. pressing said first film onto said first major side by use of a first roll thereby creating a metal polymer laminate, wherein said first film is primarily polyester and comprises at least one layer,
   g. post treating said metal polymer laminate by heating said metal polymer laminate to at least a final bonding temperature of said first film to said metal substrate, and
   h. cooling said metal polymer laminate to result in a finished product,
whereby said finished product has said desirable simultaneous commercial properties comprising:
   i. bonding of said first film onto said metal substrate of at least 43 ounces per inch, j. a pencil hardness of at least 2B, and k. successfully passing metal can pack testing of at least thirty days.

2. The processing steps according to claim 1 wherein the following steps are done prior to said post treating of said metal polymer laminate:
   r. additionally heating said metal polymer laminate to at least 200° F. if necessary,
   s. increasing the surface energy of the second major side of said metal substrate,
   t. preselecting a second film for bonding to the second major side of said metal substrate,
   l. pressing said second film onto the second major side by use of a second roll, and
   u. wherein said second roll is
      i. opposite of said first roll to create a roll nip, or
      ii. a selected distance sequentially after said first roll.

3. The processing steps according to claim 2 wherein any said film is trimmed to match the width of said metal substrate prior to being pressed against said metal substrate according to a predetermined tolerance.

4. The processing steps according to claim 2 wherein at least one item from the group consisting of:
   i) said first roll, and
   ii) said second roll
is controlled to selected temperature by at least one item from the group consisting of:
   a) heating equipment, and
   b) cooling equipment.

5. The processing steps according to claim 2 wherein said processing line is either:
   a) a continuous operation, or
   b) a batch operation.

6. The processing steps according to claim 2 wherein any heating incorporates the lengthwise speed of said metal substrate.

7. The processing steps according to claim 1 wherein said post heating of said metal polymer laminate is below a melting point temperature of a preselected layer of said first film.

8. Processing steps for laminating a metal substrate with a thermoplastic polymer film to create desirable simultaneous commercial properties comprising:
   a. uncoiling a metal substrate from a coil on a processing line, wherein said metal substrate is flat rolled,
   b. cleaning said metal substrate with a cleaning system,
   c. increasing the surface energy of a first major side of said metal substrate to a bonding level by at least one of:
      i. said cleaning of said metal substrate, and
      ii. surface energy pretreatment equipment,
   d. preselecting a film for bonding to said metal substrate, wherein said film is biaxially oriented,
   e. preheating said metal substrate to an initial bonding temperature of said film to said metal substrate,
   f. pressing said film onto said metal substrate with roll pressing equipment thereby creating a metal polymer laminate, wherein said film comprises at least one layer,
   g. post treating said metal polymer laminate by heating said metal polymer laminate to at least a final bonding temperature of said film to said metal substrate, wherein said final bonding temperature is below a melting point of a preselected layer of said film,
   h. cooling said metal polymer laminate, and
   i. coiling said metal polymer laminate into a finished coil, whereby said finished coil has desirable simultaneous commercial properties comprising:
      j. bonding of said film onto said metal substrate of at least 43 ounces per inch,
      k. a pencil hardness of at least 2B, and
      l. successfully passing metal can pack testing for at least thirty days.

9. The processing steps according to claim 8 wherein the following steps are done prior to said post treating of said metal polymer laminate:
   v. preselecting a second film for bonding to the uncoated major side of said metal substrate,
   m. pressing said second film onto the second major side by use of said roll pressing equipment.

10. The processing steps according to claim 9 wherein any said film is trimmed to match the width of said metal substrate prior to being pressed against said metal substrate according to a predetermined tolerance.

11. The processing steps according to claim 8 wherein said post heating of said metal polymer laminate is below a melting point temperature of a preselected layer of said first film.

12. Processing steps for laminating a metal substrate with multiple films to create desirable simultaneous commercial properties comprising:
   a. uncoiling a metal substrate from a coil on a processing line, wherein said metal substrate is flat rolled,
   b. cleaning a first major side of said metal substrate with a cleaning system,
   c. increasing the surface energy of a first major side of said metal substrate to a bonding level by at least one of:
      i. said cleaning of said first major side, and
      ii. surface energy pretreatment equipment,
   d. preheating said metal substrate to at least 200° F.,
   e. preselecting a plurality of first films for bonding to said first major side,
   f. pressing said first films onto said first major side by use of a first roll, thereby creating a metal polymer laminate,
   g. wherein said first films are separated by a predetermined gap,
   h. wherein said first films comprises at least one layer,
   i. post treating said metal polymer laminate by heating said metal polymer laminate to at least the bonding temperature of said first films to said metal substrate, and
   j. cooling said metal polymer laminate for coiling into a finished coil,
whereby said finished coil has said desirable simultaneous commercial properties comprising:
   k. bonding of said first film onto said metal substrate of at least 43 ounces per inch,
   l. a pencil hardness of at least 2B, and
   m. successfully passing metal can pack testing of at least thirty days.

13. The processing steps according to claim 12 wherein any said film is trimmed to match the width of said metal substrate prior to being pressed against said metal substrate according to a predetermined tolerance.

14. The processing steps according to claim 12 wherein said post heating of said metal polymer laminate is below a melting point temperature of a preselected layer of said first film.

* * * * *